(12) United States Patent
Chai et al.

(10) Patent No.: US 9,605,417 B2
(45) Date of Patent: Mar. 28, 2017

(54) SYSTEM AND METHOD FOR HARVESTING RAINWATER

(71) Applicants: Chongqing University, Chongqing (CN); Promotion Centre of Science and Technology Development, Ministry of Housing and Urban-Rural Development of the People's Republic of China, Beijing (CN)

(72) Inventors: Hongxiang Chai, Chongqing (CN); Feng Zhang, Beijing (CN); Weijie Wang, Chongqing (CN); Yanrong Bao, Chongqing (CN); Luwei Guo, Chongqing (CN); Shen Li, Chongqing (CN); Hua Zhao, Beijing (CN)

(73) Assignees: CHONGQING UNIVERSITY, Chongqing (CN); Promotion Centre of Science and Technology Development, Ministry of Housing and Urban-Rural Development of the People's Republic of China, Beijing (CN)

( * ) Notice: Subject to any disclaimer, the term of this patent is extended or adjusted under 35 U.S.C. 154(b) by 666 days.

(21) Appl. No.: 14/091,368

(22) Filed: Nov. 27, 2013

(65) Prior Publication Data

US 2014/0144835 A1 May 29, 2014

(30) Foreign Application Priority Data

Nov. 27, 2012 (CN) .......................... 2012 1 0489913

(51) Int. Cl.
*E03B 3/02* (2006.01)
*E04D 11/00* (2006.01)
(Continued)

(52) U.S. Cl.
CPC .............. *E03B 3/02* (2013.01); *E04D 11/002* (2013.01); *C02F 1/281* (2013.01); *C02F 3/327* (2013.01);
(Continued)

(58) Field of Classification Search
CPC .. C02F 1/281; C02F 9/00; C02F 3/127; C02F 2103/001; C02F 2203/002;
(Continued)

(56) References Cited

U.S. PATENT DOCUMENTS

2001/0030161 A1* 10/2001 Hosoya ................... C02F 1/722
210/744
2004/0031753 A1* 2/2004 Herman ................. B01D 39/04
210/617

(Continued)

FOREIGN PATENT DOCUMENTS

CN   102383533 A * 3/2012
NL   EP 2050891 A1 * 4/2009 ........... E04D 11/002

*Primary Examiner* — Matthew O Savage
(74) *Attorney, Agent, or Firm* — Matthias Scholl P.C.; Matthias Scholl

(57) ABSTRACT

A system for harvesting rainwater for use in a skirt building. The skirt building includes a main building and a podium supporting the main building. The system includes: a standpipe; a buffer channel; a filter channel; and a green roof. The green roof includes a vegetation region including a baffled diversion corridor, and a bottom filtering layer including a drainage pipe. The standpipe is arranged on the main building and is connected to the buffer channel where the energy of rainwater flowing out of the standpipe is dissipated. The buffer channel, the filter channel, and the green roof are arranged on the podium, and the buffer channel communicates with the filter channel. The filter channel is connected (Continued)

to the green roof. The filter channel is divided into a plurality of sections respectively filled with different matrix materials.

6 Claims, 4 Drawing Sheets

(51) Int. Cl.
| | | |
|---|---|---|
| | *C02F 1/28* | (2006.01) |
| | *C02F 103/00* | (2006.01) |
| | *C02F 9/00* | (2006.01) |
| | *C02F 3/32* | (2006.01) |
| | *E03B 1/04* | (2006.01) |

(52) U.S. Cl.
CPC .......... *C02F 9/00* (2013.01); *C02F 2103/001* (2013.01); *C02F 2203/002* (2013.01); *C02F 2307/00* (2013.01); *E03B 2001/047* (2013.01); *Y02B 80/32* (2013.01)

(58) Field of Classification Search
CPC ...... C02F 2307/00; E04D 11/002; E03B 3/02; E03B 2001/047; Y02B 80/32
See application file for complete search history.

(56) References Cited

U.S. PATENT DOCUMENTS

| | | | |
|---|---|---|---|
| 2007/0256966 A1* | 11/2007 | Siviter | ............... B01D 21/0012 210/150 |
| 2009/0001002 A1* | 1/2009 | Bauer | ..................... C02F 3/046 210/138 |
| 2010/0051540 A1* | 3/2010 | Wanielista | ............. B01J 20/043 210/602 |
| 2010/0096333 A1* | 4/2010 | Foreman | .............. B01J 20/0229 210/679 |

* cited by examiner

SYSTEM AND METHOD FOR HARVESTING RAINWATER

CROSS-REFERENCE TO RELATED APPLICATIONS

Pursuant to 35 U.S.C. §119 and the Paris Convention Treaty, this application claims the benefit of Chinese Patent Application No. 201210489913.5 filed Nov. 27, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

Field of the Invention

The invention relates to a system and method for use in a skirt building for harvesting rainwater.

Description of the Related Art

Water shortage has been a problem that influences daily lives of people. On one hand, the water shortage results in farmland drought and the decrease of the groundwater; and on the other hand, excessive excavation of groundwater destroys the local groundwater and ecological environment. However, in rainy season, many regions are plagued by floods. The rainwater resource cannot be fully utilized while pollutants on the urban ground surface are brushed and dissolved by rainfalls, whereby causing serious pollution in rivers. A typical system for draining rainwater from a low-rise building includes rainwater drained cells and downpipes. The rainwater drained cells are arranged on edges of the roof, the rainwater outlet of each of the rainwater drained cells is connected to the downpipe for directly draining rainwater to the ground, whereby leading to a waste of water resources.

SUMMARY OF THE INVENTION

In view of the above-described problems, it is one objective of the invention to provide a system and method for use in a skirt building for harvesting rainwater.

To achieve the above objective, in accordance with one embodiment of the invention, there is provided a system for use in a skirt building for harvesting rainwater, the skirt building comprising a main building and a podium supporting the main building, the system comprising: a standpipe; a buffer channel; a filter channel; and a green roof. The green roof comprises a vegetation region comprising a baffled diversion corridor, and a bottom filtering layer comprising a drainage pipe. The standpipe is arranged on the main building and is connected to the buffer channel where the energy of rainwater flowing out of the standpipe is dissipated. The buffer channel, the filter channel, and the green roof are arranged on the podium, and the buffer channel communicates with the filter channel. The filter channel is connected to the green roof. The filter channel is divided into a plurality of sections respectively filled with different matrix materials comprising crushed stone, coarse sand, fine sand, and slag, and the sections are separated by grilles and geotextiles. The bottom filtering layer from top to bottom comprises soil, fine gravel, pebble, slag, and coarse gravel, and exuded water from the bottom filtering layer is drained by the drainage pipe; a water outlet is disposed at one end of the baffled diversion corridor.

In a class of this embodiment, the buffer channel is divided into a water inlet end, a middle part, a water outlet end, each comprising a plurality of buffer belts. The buffer belts at the water inlet end comprise stones of relatively large volumes. The buffer belts at the middle part and the water outlet end comprise relatively small pebbles of different grade configurations; a cross section of the buffer belts is in a shape of an equilateral triangle; and a bottom of the buffer belts is fixed on a bottom of the buffer channel.

In a class of this embodiment, the green roof is reconstructed from a common green roof by arranging the baffled diversion corridor in the vegetation region for allowing rainwater to flow in the baffled diversion corridor in the vegetation region in the form of a letter "S".

In a class of this embodiment, the baffled diversion corridor is provided with ridges for separating the baffled diversion corridor into a plurality of water storage units, and the rainwater runoff is required to overflow the ridge to enter a next water storage unit.

In a class of this embodiment, a height of the ridge is lower than a height of the baffled diversion corridor, and the ridge comprises fine gravels.

In a class of this embodiment, the drainage pipe in the bottom drainage layer of the green roof is connected to a rainwater harvesting device.

In accordance with one embodiment of the invention, there is provided a method for use in a skirt building for harvesting rainwater using the system, the method comprising: 1) transporting the rainwater from the standpipe of the main building to the buffer channel for energy dissipation; 2) introducing the rainwater after energy dissipation to the filter channel for preliminary interception and filtration; 3) introducing the rainwater flowing out of the filter channel to the green roof for plant filtration and percolation; 4) harvesting percolated rainwater by the drainage pipe arranged on the bottom filtering layer of the green roof; and 5) harvesting the rainwater effusing from the water outlet disposed at the end of the baffled diversion corridor.

Advantages of the invention are summarized as follows:

Rainwater from the main building mainly enters the green roof for filtration and percolation, so that the water quality is significantly improved, clean water after filtration is harvested and utilized, thereby avoiding waste of the rainwater resource.

The rainwater flows in the baffled diversion corridor of the green roof in a form of the letter "S", thereby prolonging the duration of the rainwater flowing out of the roof, weakening a peak flow on urban road, and reducing the frequency of urban waterlogging resulting from rainstorm.

DETAILED DESCRIPTION OF THE EMBODIMENTS

For further illustrating the invention, experiments detailing a system and a method for use in a skirt building for harvesting rainwater are described below. It should be noted that the following examples are intended to describe and not to limit the invention.

Figure 1:
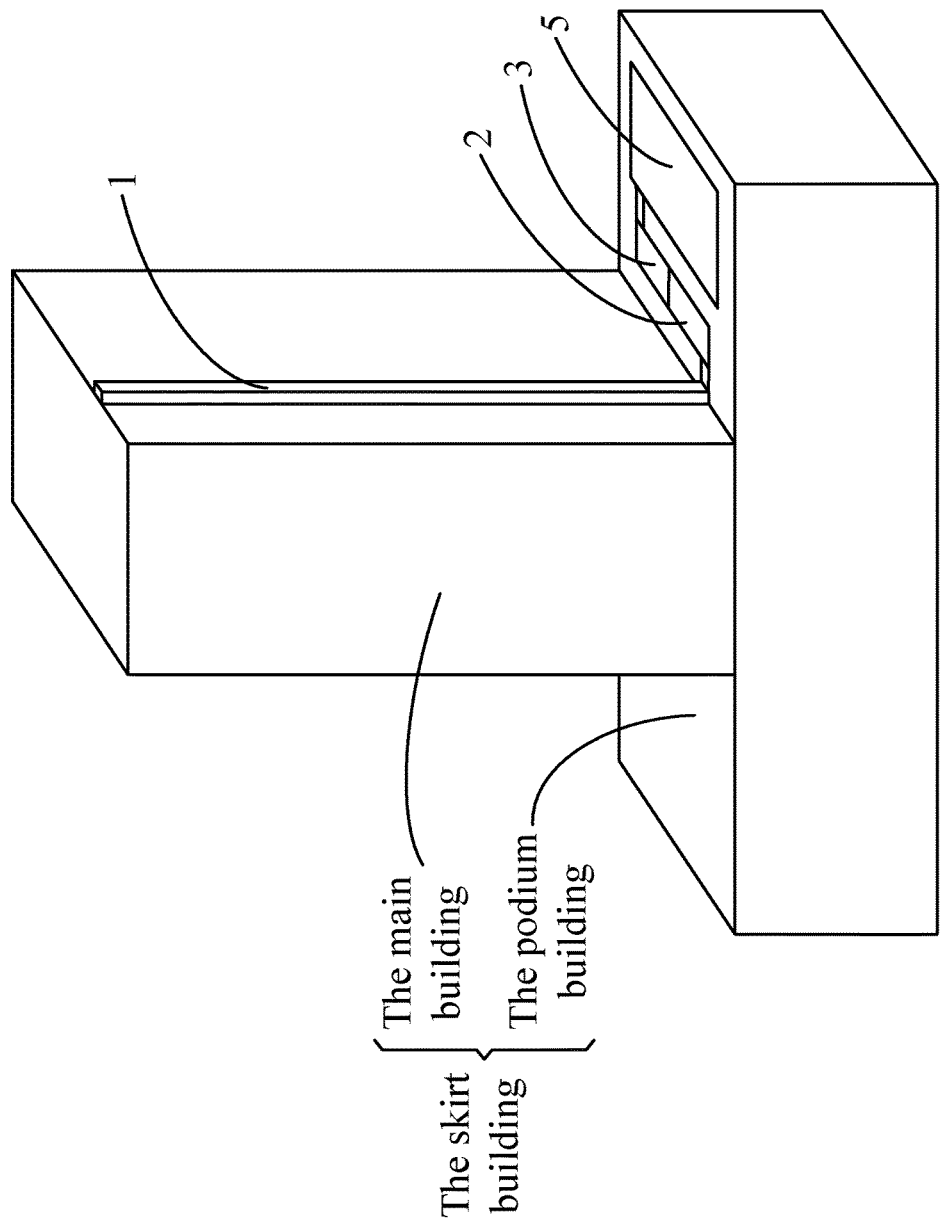
FIG. 1 shows the skirt building
Figure 4:
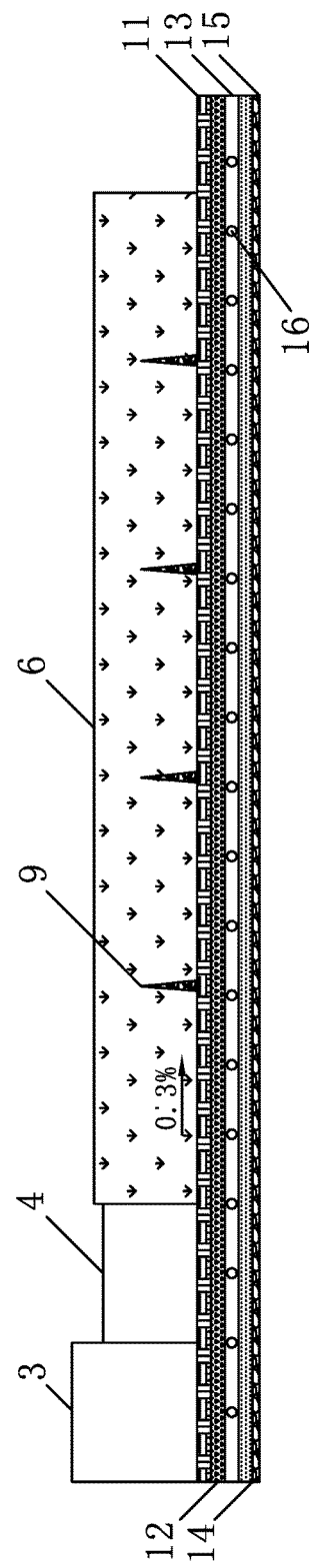
FIG. 4 is a side view of the green roof.

A system for use in a skirt building for harvesting rainwater, comprises: a standpipe 1; a buffer channel 2; a filter channel 3; and a green roof 5. The skirt building comprises a main building and a podium supporting the main building (see FIGS. 1-2). The green roof comprises a vegetation region 7 comprising a baffled diversion corridor 6, and a bottom filtering layer comprising a drainage pipe 16 (see FIGS. 2 and 4).

The standpipe 1 is arranged on the main building and is connected to the buffer channel 2 where the energy of rainwater flowing out of the standpipe 1 is dissipated. The buffer channel 2, the filter channel 3, and the green roof 5 are arranged on the podium, and the buffer channel 3 communicates with the filter channel 3. The filter channel 3 is connected to the green roof 5 by a channel 4 (see FIG. 4). The filter channel 3 is divided into a plurality of sections respectively filled with different matrix materials comprising crushed stone 31, coarse sand 32, fine sand 33, and slag 34 and the sections are separated by grilles and geotextiles 35 (see FIG. 3). The bottom filtering layer from top to bottom comprises soil 11, fine gravel 12, pebble 13, slag 14, and coarse gravel 15, and exuded water from the bottom filtering layer is drained by the drainage pipe 16 (see FIG. 4); a water outlet 8 is disposed at one end of the baffled diversion corridor 6 (see FIG. 2).

Figure 2:
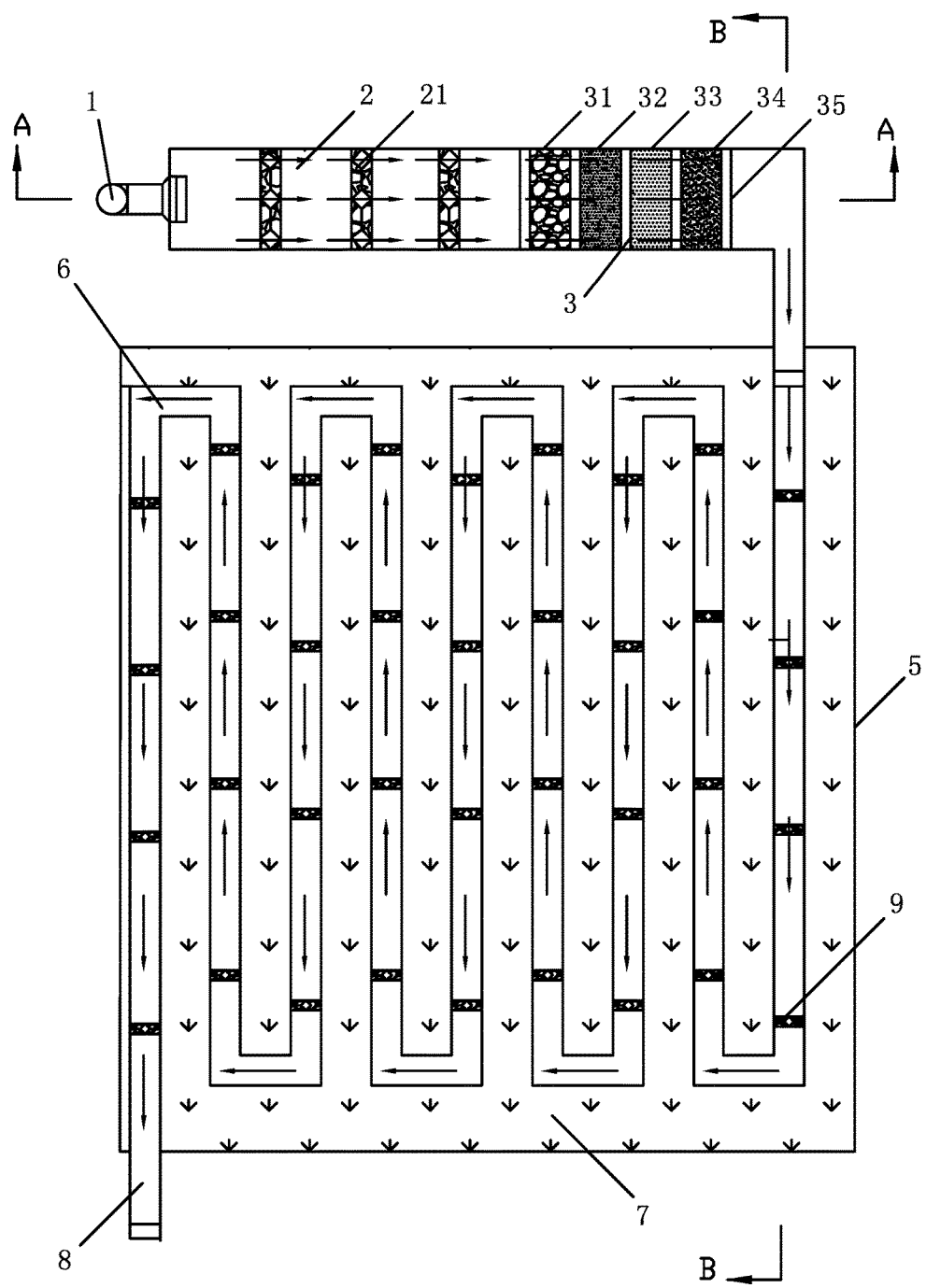
FIG. 2 is a top view of the buffer channel, filter channel, and green roof.
Figure 3:
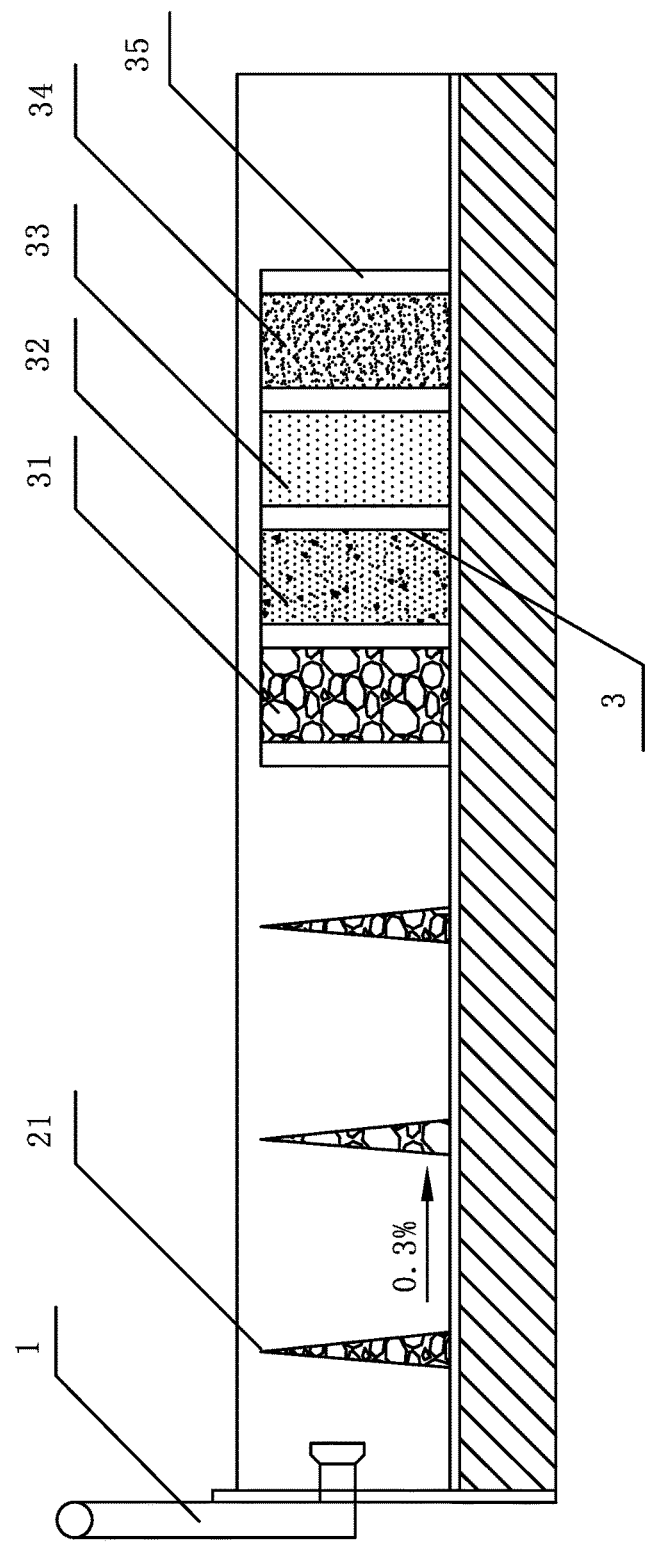
FIG. 3 is a side view of the buffer channel and filter channel.

The buffer channel 2 is arranged in the front end of the system (see FIG. 2). The buffer channel 2 is divided into a water inlet end, a middle part, a water outlet end, each comprising a plurality of buffer belts 21. The buffer belts 21 at the water inlet end comprise stones of relatively large volumes. The buffer belts 21 at the middle part and the water outlet end comprise relatively small pebbles of different grade configurations; a cross section of the buffer belts 21 is in a shape of an equilateral triangle; and a bottom of the buffer belts 21 is fixed on a bottom of the buffer channel 2.

The rainwater of the main building is transported to the water inlet end of the buffer channel 2 of the skirt building via the standpipe 1. A scale height of a top of the gravel buffer zone is lower than a scale height of a top of the buffer channel 2. A size of the buffer channel 2 is determined by a designed flow rate of the rainwater of the main building and flow rate of water outflow thereof. A slope of the buffer channel 2 is 0.3%. The water outflow is directly transported to the filter channel.

The rainwater after energy dissipation by the buffer channel 2 is transported to the filter channel 3 for filtration. The filter channel 3 is filled with matrix materials of different grades, and the different matrix materials 31-34 are separated by grilles and geotextiles 35 (see FIG. 3). A length of the filter channel 3 is determined by a pollutant concentration in the rainwater water entering the filter channel 3.

The green roof 5 is reconstructed from a common green roof of the skirt building. The rainwater flows in a baffled diversion corridor 6 arranged in the vegetation region of the green roof in the form of a letter "S" (see FIG. 2). Each baffled diversion corridor 6 is divided into a plurality of water storage units by arranging ridges 9 (see FIGS. 2 and 4). The rainwater is required to overflow the ridge 9 to enter a next water storage unit. A height of the ridge 9 is lower than a height of the baffled diversion corridor 6. The ridge 6 comprises crushed stones of a certain grade. A lower part of the green roof is provided with a filtering layer having a slope of 0.3%.

The method for use in a skirt building for harvesting rainwater using the system comprises: 1) transporting the rainwater from the standpipe 1 of the main building to the buffer channel 2 for energy dissipation; 2) introducing the rainwater after energy dissipation to the filter channel 3 for preliminary interception and filtration; 3) introducing the rainwater flowing out of the filter channel 3 to the green roof 5 for plant filtration and percolation; 4) harvesting percolated rainwater by the drainage pipe 6 arranged on the bottom filtering layer of the green roof 5; and 5) harvesting the rainwater effusing from the water outlet 6 disposed at the end of the baffled diversion corridor 6.

Working principle of the system for harvesting rainwater from the skirt building of the invention is as follows: the rainwater from the main building is transported to the buffer channel 2 comprising a gravel buffer zone to dissipate high energy of the rainwater, so that the flow velocity of the rainwater is decreased. The energy dissipated rainwater enters the filter channel 3 at a low flow velocity, and pollutants in the rainwater is preliminarily intercepted and filtrated, thereby decreasing the pollutant load. The rainwater outflow from the filter channel 3 is transported to the green roof 5 for plant filtration, percolation, thereby further decreasing the flow velocity. Thus, the pollutant load in the rainwater is further decreased, the percolated rainwater is harvested and utilized, and the use of rainwater outflow from the rear end of the green roof is determined according to water quality thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for harvesting rainwater in a skirt building, the skirt building comprising a main building and a podium building, the podium building being disposed below the main building and supporting the main building, the system comprising:
　a) a standpipe;
　b) a buffer channel comprising a first outlet;
　c) a filter channel comprising a second inlet, a second outlet, and a plurality of sections;
　d) a green roof comprising a vegetation region, a water channel, and a bottom filtering layer; and
　e) a drainage pipe;
　wherein:
　　the standpipe is adapted to be arranged on the main building and is connected to the buffer channel where the energy of rainwater flowing out of the standpipe is dissipated;
　　the buffer channel, the filter channel, and the green roof are arranged on the podium building;
　　the first outlet of the buffer channel communicates with the second inlet of the filter channel;
　　each of the plurality of sections is filled with a matrix material, the matrix material in each one of the plurality of sections is different from that in another one of the plurality of sections; and the matrix material comprises crushed stone, coarse sand, fine sand, and slag;
　　each one of the plurality of sections is separated from another one of the plurality of sections by grilles and geotextiles;
　　the second outlet of the filter channel is connected to one end of the water channel;
　　the water channel is disposed in the vegetation region;
　　a water outlet is disposed at another end of the water channel;

the bottom filtering layer is disposed below the water channel and the vegetation region;

the bottom filtering layer from top to bottom comprises soil, fine gravel, pebbles, slag, and coarse gravel; and the drainage pipe is disposed inside the pebbles of the bottom filtering layer for collecting water form the bottom filtering layer.

2. The system of claim 1, further comprising a plurality of buffer belts disposed in the buffer channel, wherein the buffer channel comprises a water inlet end, a middle part, and a water outlet end;

the plurality of buffer belts comprises a first buffer belt, a second buffer belt, and a third buffer belt the first buffer belt is disposed in the water inlet end; the second buffer belt is disposed in the middle part; and the third buffer belt is disposed in the water outlet end;

the first buffer belt comprises a plurality of stones; each of the second buffer belt and the third buffer belt comprises a plurality of pebbles; a first volume of the plurality of stones is larger than a second volume of the plurality of pebbles;

a cross section of the plurality of buffer belts is in a shape of an equilateral triangle; and the plurality of buffer belts is disposed on a bottom of the buffer channel.

3. The system of claim 1, wherein the water channel in the vegetation region is in a form of a letter "S".

4. The system of claim 3, wherein the water channel is provided with ridges for separating the water channel into a plurality of water storage units.

5. The system of claim 4, wherein a height of the ridge is lower than a height of the water channel, and the ridge comprises fine gravels.

6. A method for harvesting rainwater in a skirt building using the system of claim 1, the method comprising:
1) transporting the rainwater from the standpipe of the main building to the buffer channel for energy dissipation;
2) introducing the rainwater after energy dissipation to the filter channel for preliminary filtration to yield preliminary filtered rainwater;
3) introducing the preliminary filtered rainwater flowing out of the filter channel to the water channel of the green roof for plant filtration and percolation;
4) introducing a first part of the preliminary filtered rainwater from the water channel of the green roof to the bottom filtering layer to yield secondary filtered rainwater;
5) harvesting the secondary filtered rainwater by the drainage pipe disposed inside the bottom filtering layer of the green roof; and
6) harvesting a second part of the preliminary filtered rainwater discharged from the water outlet.

* * * * *